(12) United States Patent
Yano et al.

(10) Patent No.: US 12,050,617 B2
(45) Date of Patent: Jul. 30, 2024

(54) INFORMATION PROCESSING DEVICE, INFORMATION PROCESSING METHOD, AND STORAGE MEDIUM STORING INFORMATION PROCESSING PROGRAM

(71) Applicant: TOYOTA JIDOSHA KABUSHIKI KAISHA, Toyota (JP)

(72) Inventors: Masao Yano, Sunto-gun (JP); Tetsuya Shoji, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/315,491

(22) Filed: May 10, 2021

(65) Prior Publication Data

US 2021/0365472 A1 Nov. 25, 2021

(30) Foreign Application Priority Data

May 19, 2020 (JP) ................................ 2020-087718

(51) Int. Cl.
 *G06F 16/26* (2019.01)
 *G06F 16/23* (2019.01)
 *G06F 16/2457* (2019.01)

(52) U.S. Cl.
 CPC .......... *G06F 16/26* (2019.01); *G06F 16/2358* (2019.01); *G06F 16/2457* (2019.01)

(58) Field of Classification Search
 CPC ... G06F 16/26; G06F 16/2358; G06F 16/2457
 See application file for complete search history.

(56) References Cited

U.S. PATENT DOCUMENTS

| | | | |
|---|---|---|---|
| 2007/0143042 A1* | 6/2007 | Stewart | G01N 30/8662 702/50 |
| 2014/0186939 A1* | 7/2014 | Peterman | G01N 30/6095 356/301 |
| 2019/0017916 A1 | 1/2019 | Mizuno et al. | |

(Continued)

FOREIGN PATENT DOCUMENTS

| | | | |
|---|---|---|---|
| JP | 2005-346362 A | | 12/2005 |
| JP | 2010102405 A | * | 5/2010 |
| JP | 2019-20411 A | | 2/2019 |

(Continued)

OTHER PUBLICATIONS

Satoshi Takaya, et al., "Deterioration Index of Acrylic Top Coat by Raman Spectroscopy," Journal of the Society of Materials Science, Japan, vol. 68, No. 10, Oct. 2019 pp. 779-784 (with English Translation).

(Continued)

*Primary Examiner* — Mark D Featherstone
*Assistant Examiner* — Ranjit P Doraiswamy
(74) *Attorney, Agent, or Firm* — Oblon, McClelland, Maier & Neustadt, L.L.P.

(57) ABSTRACT

An information processing device receives material data, relating to a material, that have been sent from a user terminal. The information processing device performs analysis in accordance with one or more analysis techniques with respect to the material data to thereby acquire analysis result data representing analysis results. The information processing device sends the analysis result data to the user terminal.

7 Claims, 11 Drawing Sheets

(56) References Cited

U.S. PATENT DOCUMENTS

2020/0349170 A1* 11/2020 Rajendiran .......... G06T 11/206

FOREIGN PATENT DOCUMENTS

| JP | 2019-060741 A | 4/2019 |
|---|---|---|
| JP | 2019-204537 A | 11/2019 |

OTHER PUBLICATIONS

Hiroshi Okuda, "How can we make use of synchrotron radiation to study phase transformations in magnesium alloys containing long-period stacking ordered (LPSO) structures?", Journal of the Japan Institute of Light Metals, vol. 69, No. 4 (2019), pp. 211-216 (with English Translation).
Toshiaki Ota, "X-ray Absorption Spectroscopy: XAFS and Its Application", IPC, 2002, pp. 55-63 (with English Translation).
Chinese Office Action dated Mar. 30, 2024 in Chinese Patent Application No. 20211015794.5, with English Machine Translation.
"Zero Basic Easy SQL Server 2016", p. 95, Beijing, Machine Industry Press, Apr. 2020.

* cited by examiner

FIG.3

| SCATTERING ANGLE | SCATTERING INTENSITY | ... |
|---|---|---|
| x1 | y1 | ... |
| x2 | y2 | ... |
| ... | ... | ... |
| ... | ... | ... |

| ANALYSIS TECHNIQUE ID | PROGRAM | ... |
|---|---|---|
| 00001 | ... | ... |
| 00002 | ... | ... |
| ... | ... | ... |
| ... | ... | ... |

FIG.6

0001_SAXS

| | key1 | key2 | ... | DATA CONTENT |
|---|---|---|---|---|
| MATERIAL DATA { | raw | – | ... | MATERIAL DATA |
| | – | intensity | ... | SCATTERING INTENSITY |
| | – | ... | ... | ... |
| ANALYSIS RESULT DATA { | analyzed | – | ... | PARTICLE SIZE DISTRIBUTION |
| | – | r | ... | PARTICLE SIZE RANGE |
| | – | ... | ... | ... |
| | pred | – | ... | STATISTICAL ANALYSIS RESULTS |
| | – | r_average | ... | AVERAGE PARTICLE SIZE |
| | ... | ... | ... | ... |

INFORMATION PROCESSING DEVICE, INFORMATION PROCESSING METHOD, AND STORAGE MEDIUM STORING INFORMATION PROCESSING PROGRAM

CROSS-REFERENCE TO RELATED APPLICATION

This application is based on and claims priority under 35 USC 119 from Japanese Patent Application No. 2020-087718 filed on May 19, 2020, the disclosure of which is incorporated by reference herein.

BACKGROUND

Technical Field

This disclosure relates to an information processing device, an information processing method, and an storage medium storing an information processing program.

Related Art

Various analysis techniques are used to acquire information about the insides of materials. For example, document 1 (Takaya, et. al., "Deterioration Index of Acrylic Top Coat by Raman Spectroscopy," *Journal of the Society of Materials Science*, Japan, Vol. 68, No. 10, pp. 779-784, October 2019) discloses a technique for analyzing a particular material using Raman spectroscopy. Furthermore, document 2 (Hiroshi Okuda, "How can we make use of synchrotron radiation to study phase transformations in magnesium alloys containing long-period stacking ordered (LPSO) structures?", *Journal of the Japan Institute of Light Metals*, Vol. 69, No. 4 (2019), 211-216) discloses a technique for analyzing a particular material by synchrotron radiation. Furthermore, document 3 (Toshiaki Ōta, *X-ray Absorption Spectroscopy: XAFS and Its Application*, IPC, 2002) discloses analysis techniques according to X-ray absorption spectroscopy.

In order to know the properties and so forth of a given particular material, it is necessary to perform an analysis according to plural analysis techniques with respect to the material. By performing an analysis according to plural analysis techniques with respect to the material, the properties of the material become evident with the results of those plural analyses.

However, attempting to analyze a material using plural analysis techniques such as those disclosed in documents 1 to 3 takes an enormous amount of effort and time. Furthermore, for example, when there are plural materials to analyze or when there are plural samples with respect to one material, it is necessary to implement an analysis using various analysis techniques also with respect to each of those plural materials, which takes an enormous amount of effort and time.

For this reason, implementing analysis techniques such as those disclosed in documents 1 to 3 in conventional ways has the problem that material analysis cannot be efficiently performed.

SUMMARY

In consideration of the above circumstances, this disclosure provides an information processing device, an information processing method, and an information processing program that can efficiently perform material analysis.

An information processing device of a first aspect includes: a receiving unit that receives material data, relating to a material, that have been sent from a user terminal; an analyzing unit that performs analysis in accordance with one or more analysis techniques with respect to the material data received by the receiving unit to thereby acquire analysis result data representing analysis results; and a sending unit that sends the analysis result data acquired by the analyzing unit to the user terminal.

The information processing device receives material data relating to a material that have been sent from a user terminal. The material data are data obtained when some kind of measurement has been performed with respect to a material. Then, the information processing device performs analysis in accordance with one or more analysis techniques with respect to the material data that have been received to thereby acquire analysis result data representing analysis results. Then, the information processing device sends the analysis result data that have been acquired to the user terminal. Because of this, an analysis according to one or more analysis techniques is automatically performed on the information processing device with respect to the material data, so material analysis can be efficiently performed. More specifically, the user can efficiently obtain material analysis results without performing the material analysis himself/herself.

An information processing device of a second aspect further includes a database, wherein the analyzing unit associates the material data with the analysis result data and stores the associated material data and analysis result data in the database.

The analyzing unit of an information processing device of a third aspect, when performing analysis with respect to the material data, selects a subject analysis technique from one or more analysis techniques in accordance with the value or type of the material data and performs analysis of the material data using the selected subject analysis technique.

In the database of an information processing device of a fourth aspect, the material data for each analysis technique and the analysis result data are associated with each other and stored. Because of this, even when there are plural types of materials to analyze or when there are plural samples with respect to one material, material analysis can be efficiently performed because various types of data are stored in the database.

An information processing device of a fifth aspect is an information processing device in an information processing system including a plurality of user terminals, an information processing device, and databases provided for each of the plurality of user terminals, wherein the information processing device receives material data, relating to materials, and user IDs for identifying the user terminals, which have been sent from the user terminals, performs analysis in accordance with one or more analysis techniques with respect to the received material data to thereby acquire analysis result data representing analysis results, sends the analysis result data to the user terminals corresponding to the received user IDs, and associates the received material data with the analysis result data and stores the associated material data and analysis result data in the databases corresponding to the received user IDs. According to the information processing device of the fifth aspect, databases are provided for each of the user terminals, so information can be appropriately managed.

An information processing device of a sixth aspect is an information processing device in an information processing system including a plurality of user terminals and information processing devices provided for each of the plurality of user terminals, each of the information processing devices comprising a database, wherein the information processing device receives material data, relating to a material, that have been sent from a specific user terminal among the plurality of user terminals, performs analysis in accordance with one or more analysis techniques with respect to the received material data to thereby acquire analysis result data representing analysis results, sends the analysis result data to the specific user terminal, and associates the received material data with the analysis result data and stores the associated material data and analysis result data in the database. According to the information processing device of the sixth aspect, information processing devices are provided for each of the user terminals, so material analysis processing can be accelerated.

An information processing method of a seventh aspect is an information processing method by which a computer executes a process including: receiving material data, relating to a material, that have been sent from a user terminal; performing analysis in accordance with one or more analysis techniques with respect to the received material data to thereby acquire analysis result data representing analysis results; and sending the acquired analysis result data to the user terminal.

An information processing program of an eighth aspect is an information processing program for causing a computer to execute a process including: receiving material data, relating to a material, that have been sent from a user terminal; performing analysis in accordance with one or more analysis techniques with respect to the received material data to thereby acquire analysis result data representing analysis results; and sending the acquired analysis result data to the user terminal.

As described above, according to this disclosure, there is the effect that material analysis can be efficiently performed.

DETAILED DESCRIPTION

Embodiment

Performing an analysis of a material using plural analysis techniques takes an enormous amount of effort and time. Furthermore, for example, when there are plural materials to analyze or when there are plural samples with respect to one material, it is necessary to implement an analysis using various analysis techniques also with respect to each of those plural materials, which takes an enormous amount of effort and time.

Thus, in this embodiment, a user sends, to a server on the cloud, data relating to a material (hereinafter simply called "material data") via a user terminal that is a terminal that the user operates. Then, the server performs material analysis based on the material data it has received and sends data of the analysis results (hereinafter simply called "analysis result data") to the user terminal. The user operating the user terminal obtains the analysis result data sent from the server. Because of this, the user can efficiently obtain the analysis result data with respect to the material data.

The server stores combinations of the material data and the analysis result data in an appropriate format in a database. For this reason, data that have been organized are stored in the database of the server. Because of this, material analysis can be efficiently performed.

An information processing system of the embodiment will be described below using the drawings.

Figure 1:
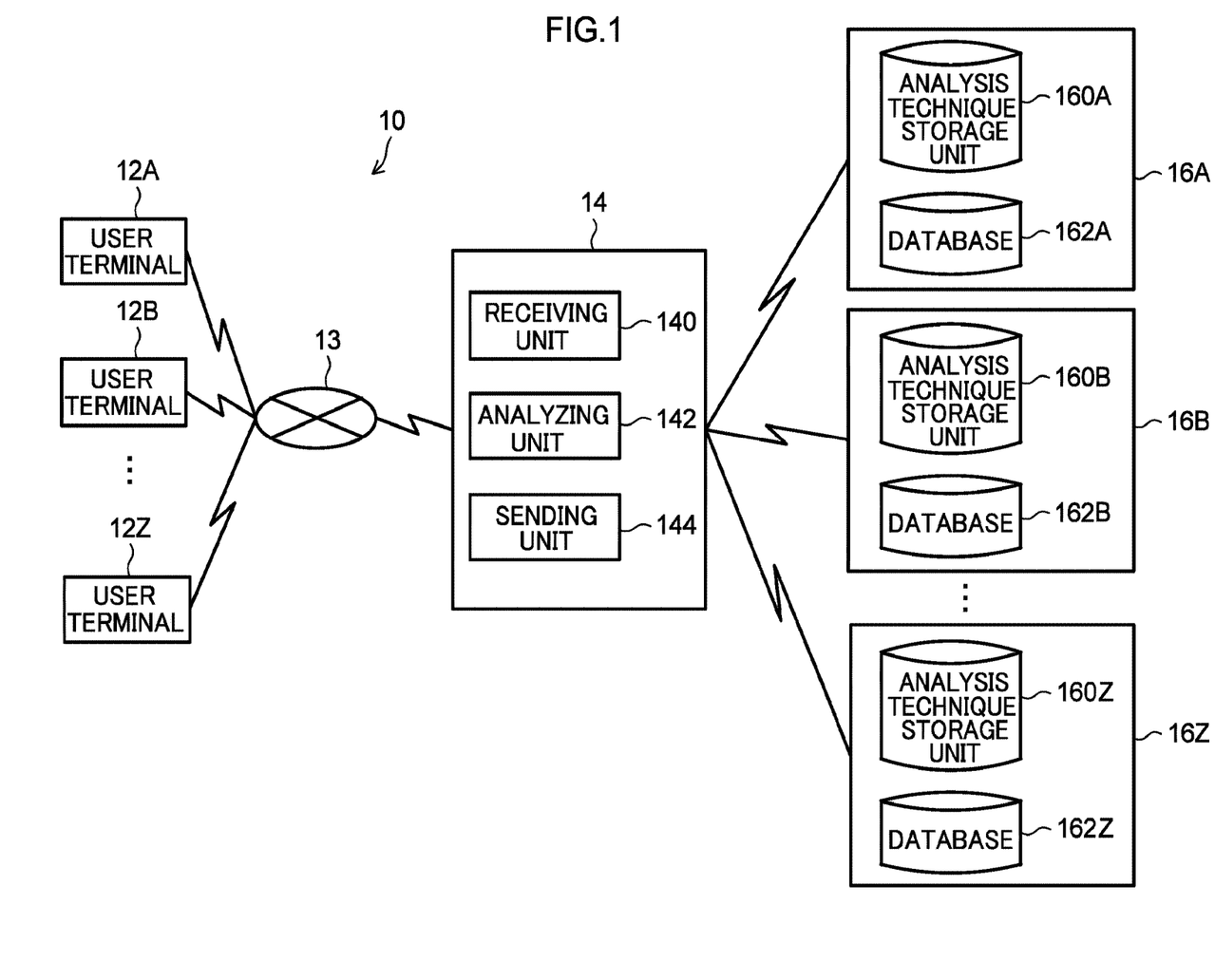
FIG. 1 is a schematic block diagram of an information processing system pertaining to an embodiment.

FIG. 1 is a block diagram showing an example of the functional configuration of an information processing system 10 pertaining to the embodiment. As shown in FIG. 1, the information processing system 10 includes plural user terminals 12A, 12B, . . . , 12Z, a server 14 that is an example of an information processing device, and plural storage devices 16A, 16B, . . . , 16Z. The plural user terminals 12A, 12B, . . . , 12Z and the server 14 are connected to each other via a network 13 such as the Internet, for example. The server 14 and the plural storage devices 16A, 16B, . . . , 16Z are connected to each other via a network such as a local area network (LAN) or the Internet, for example. Below, when indicating one user terminal, that user terminal will simply be called "the user terminal 12." Furthermore, when indicating one storage device, that storage device will simply be called "the storage device 16."

User Terminals

The plural user terminals 12A, 12B, . . . , 12Z are operated by plural different users. Each user inputs material data about a material that he/she wants to analyze to the user terminal 12 that he/she operates. Then, the user operates the user terminal 12 to send the material data to the later-described server 14. The user terminal 12 sends, via the network 13 to the server 14, the material data input by the user.

The material data of this embodiment are data obtained when some kind of measurement has been performed with respect to a material. For example, when the user wants to apply small-angle X-ray scattering (SAXS) to the material to obtain the particle size distribution and the like of particles configuring the material, data obtained by measurement according to SAXS are the material data.

Figure 2:
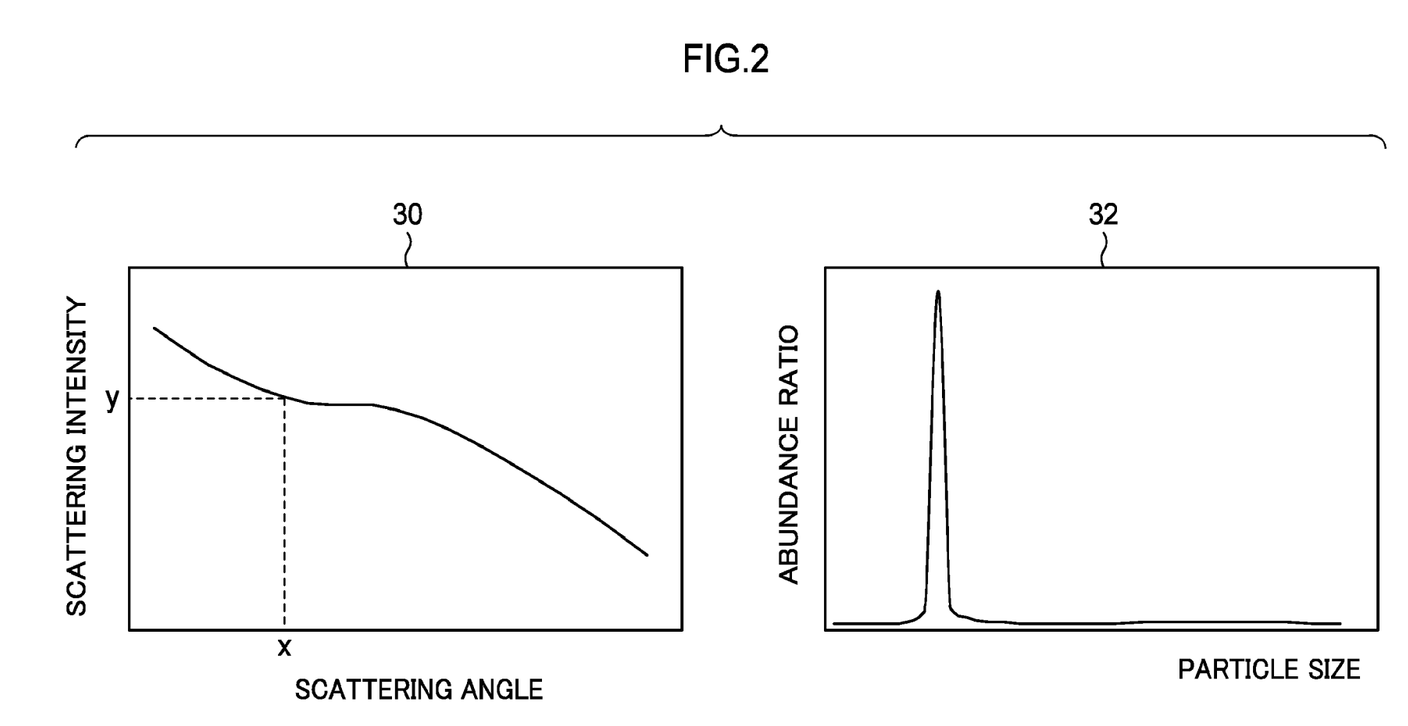
FIG. 2 is a drawing for describing material data and analysis result data pertaining to the embodiment.

FIG. 2 is a drawing for describing the material data and the analysis result data. As shown in FIG. 2, material data 30 obtained by measurement according to SAXS are a pair comprising a scattering angle x and a scattering intensity y. When the material data 30 such as shown in FIG. 2 are sent from the user terminal to the later-described server 14, the server 14 performs an analysis according to SAXS based on the material data 30 to obtain analysis result data 32. As shown in FIG. 2, the analysis result data 32 are a pair comprising the particle size of the particles included in the material and the abundance ratio of the particles of that particle size. Then, the server 14 sends the analysis result data 32 to the user terminal 12, and the user checks the analysis result data 32.

Figure 3:
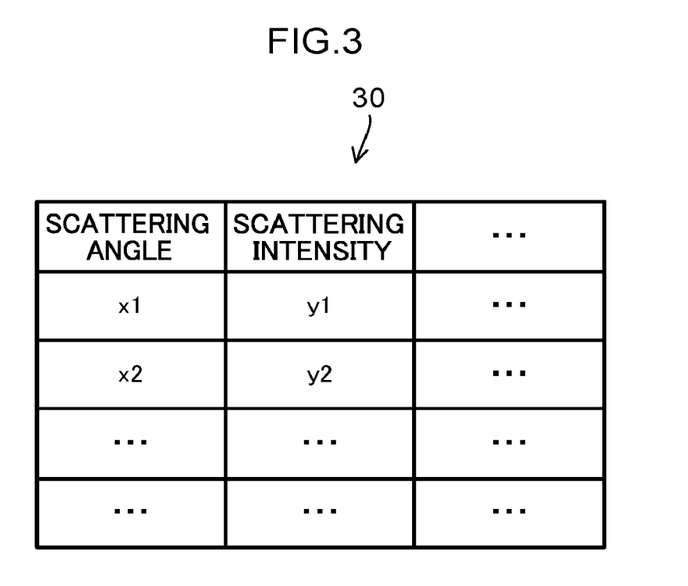
FIG. 3 is an example of a data format of the material data of the embodiment.

FIG. 3 shows an example of the data format of the material data 30. As shown in FIG. 3, the material data 30 are data obtained by measurement according to SAXS. For this reason, in the material data 30, the scattering angle and the scattering intensity are associated with other data.

FIG. 2 and FIG. 3 show an example of the material data 30 obtained by measurement according to SAXS and the analysis result data 32. Depending on the type of analysis technique, the material data and the analysis result data will be different.

For example, when applying X-ray diffraction (XRD) to the material, the material data are a combination of the angle of diffraction and the diffracted X-ray intensity, and the analysis result data are, for example, the angle of diffraction corresponding to the peak position and the half width thereof. Furthermore, when employing an analysis method using image data obtained from the material, the material data are two-dimensional image data, and the analysis result data are data obtained by analyzing the image data.

The plural user terminals 12A, 12B, . . . , 12Z send such material data to the server 14.

Storage Devices

The plural storage devices 16A, 16B, . . . , 16Z are provided for each of the plural user terminals. Specifically, the storage device 16A is provided with respect to the user terminal 12A, the storage device 16B is provided with respect to the user terminal 12B, and the storage device 16Z is provided with respect to the user terminal 12Z.

As shown in FIG. 1, the storage device 16A includes an analysis technique storage unit 160A and a database 162A. The storage device 16B includes an analysis technique storage unit 160B and a database 162B. The storage device 16Z includes an analysis technique storage unit 160Z and a database 162Z. Below, when indicating one analysis technique storage unit or database, it will simply be called "the analysis technique storage unit 160" or "the database 162" without adding A, B, . . . , Z.

The later-described server 14 selects one or more analysis techniques from the analysis technique storage unit 160 of the storage device 16 corresponding to the user terminal 12 from which the material data were sent. The server 14 analyzes the material data with the analysis technique it has selected to thereby obtain analysis result data. Then, the server 14 stores the material data and the analysis result data in the database 162 of the storage device 16 corresponding to the user terminal 12 from which the material data were sent. Details will be described later.

Server

As shown in FIG. 1, the server 14 includes a receiving unit 140, an analyzing unit 142, and a sending unit 144.

The receiving unit 140 receives a user ID for identifying the user terminal, the material data, and an analysis technique ID for identifying the analysis technique, all sent from the user terminal 12. The material data sent from the user terminal 12 may also be plural material data sets.

Figure 4:
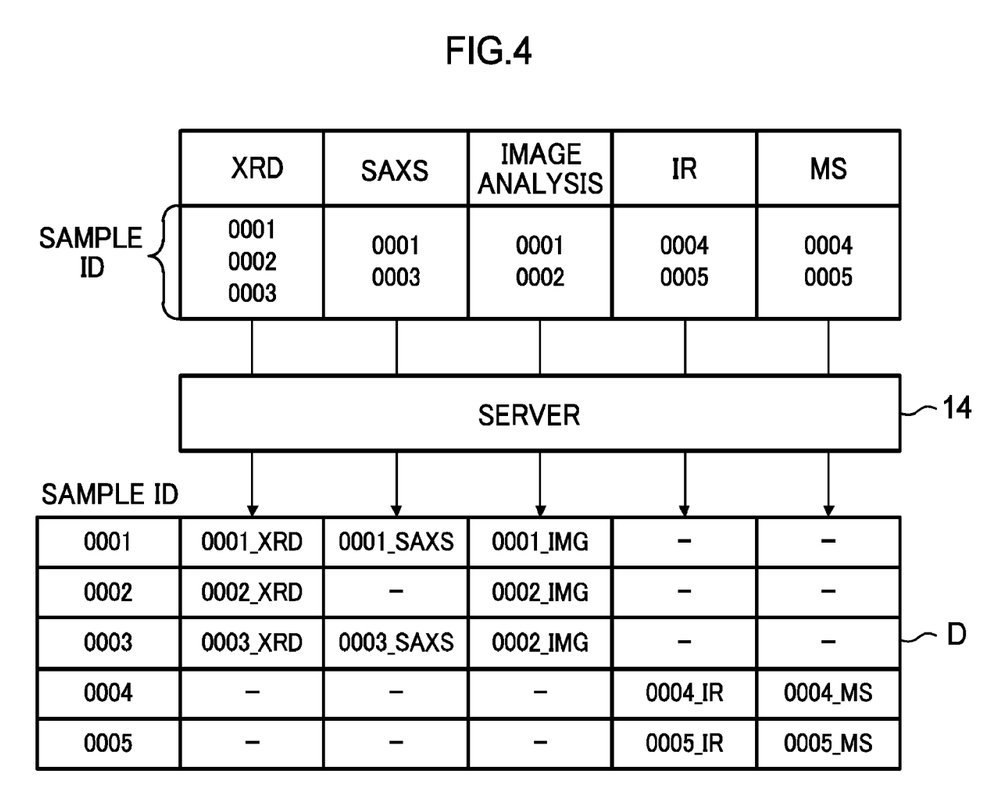
FIG. 4 is a drawing for describing an outline of operations of a server of the embodiment.

The server 14 of this embodiment analyzes the material data using plural analysis techniques and outputs to the user terminal 12 the analysis result data obtained by those analysis techniques. FIG. 4 is a drawing for describing functions of the server 14 of this embodiment.

As shown in FIG. 4, the server 14 of this embodiment analyzes the material data sent from the user terminal 12 with one or more analysis techniques among XRD, SAXS, arbitrary image analysis, infrared spectroscopy (IR), and mass spectrometry (MS), for example, to thereby obtain the analysis result data.

In the example of FIG. 4, material data with sample IDs "0001," "0002," "0003," "0004," and "0005" representing information for identifying samples of materials are shown as having been sent from the user terminal 12.

Here, the material data with sample ID "0001" are data scheduled to be analyzed by XRD, SAXS, and image analysis, and are data obtained by measurements according to each analysis method. The material data with sample ID "0002" are data scheduled to be analyzed by XRD and image analysis, and are data obtained by measurements according to each of those analysis methods. The material data with sample ID "0003" are data scheduled to be analyzed by XRD and SAXS, and are data obtained by measurements for each of those analysis methods. The material data with sample IDs "0004" and "0005" are data scheduled to be analyzed by IR and MS, and are data obtained by measurements for each of those analysis methods.

When the material data with sample IDs "0001," "0002," "0003," "0004," and "0005" such as shown in FIG. 4 are sent from the user terminal 12 to the server 14, the server 14 performs an analysis according to each material data set to thereby obtain analysis result data with respect to each material data set. Then, as shown in FIG. 4, the server 14 stores the analysis result data in a table format D, for example, in the later-described database 162.

In the example of FIG. 4, sample ID "0001," which is information for identifying the material data, "0001_XRD," which includes analysis result data obtained by XRD, "0001_SAXS," which includes analysis result data obtained by SAXS, and "0001_IMG," which includes analysis result data obtained by image analysis, are associated with respect to the material data with the sample ID "0001."

Furthermore, as shown in FIG. 4, analysis result data according to each material data set and sample IDs are also associated with respect to the material data with the other sample IDs. For example, the user can browse the analysis result data corresponding to material data of a predetermined sample by searching the database 162 at a later date.

For this reason, the analyzing unit 142 performs an analysis according to one or more analysis techniques with respect to the material data received by the receiving unit 140. Specifically, the analyzing unit 142 selects an analysis technique from plural analysis techniques stored in the analysis technique storage unit 160 of the storage device 16. In this case, the analyzing unit 142 selects, in accordance with the user ID sent from the user terminal 12, the storage device 16 corresponding to the user terminal 12 that sent the material data. For example, the analyzing unit 142 selects the storage device 16A in a case where the material data were sent from the user terminal 12A. Then, the analyzing unit 142 selects, from among the analysis techniques stored in the analysis technique storage unit 160A of the storage device 16A, the analysis technique according to the analysis technique ID sent from the user terminal 12A.

Figure 5:
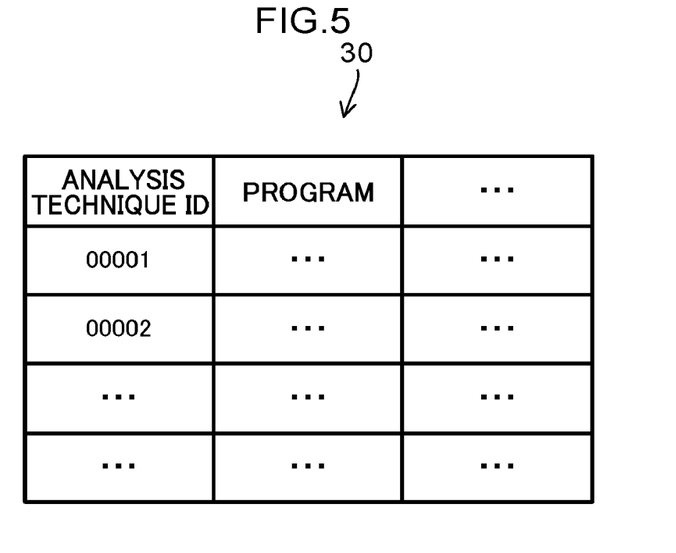
FIG. 5 is an example of data stored in an analysis technique storage unit of the embodiment.

In the analysis technique storage unit 160 are stored programs and so forth according to the plural analysis techniques. FIG. 5 is an example of the data format stored in the analysis technique storage unit 160. As shown in FIG.

5, in the analysis technique storage unit 160, analysis technique IDs representing analysis technique identification information and programs of those analysis techniques are associated with each other and stored.

Then, the analyzing unit 142 performs an analysis of the material data using the program of the subject analysis technique that was selected. Because of this, for example, analysis result data 32 such as shown in FIG. 2 are obtained by the analysis performed by the analyzing unit 142.

The sending unit 144 sends to the user terminal 12 the analysis result data obtained by the analyzing unit 142. Specifically, the sending unit 144 sends the analysis result data to the user terminal 12 corresponding to the user ID received by the receiving unit 140. For example, in a case where the user ID represents the user terminal 12A, the sending unit 144 sends the analysis result data to the user terminal 12A.

Figure 6:
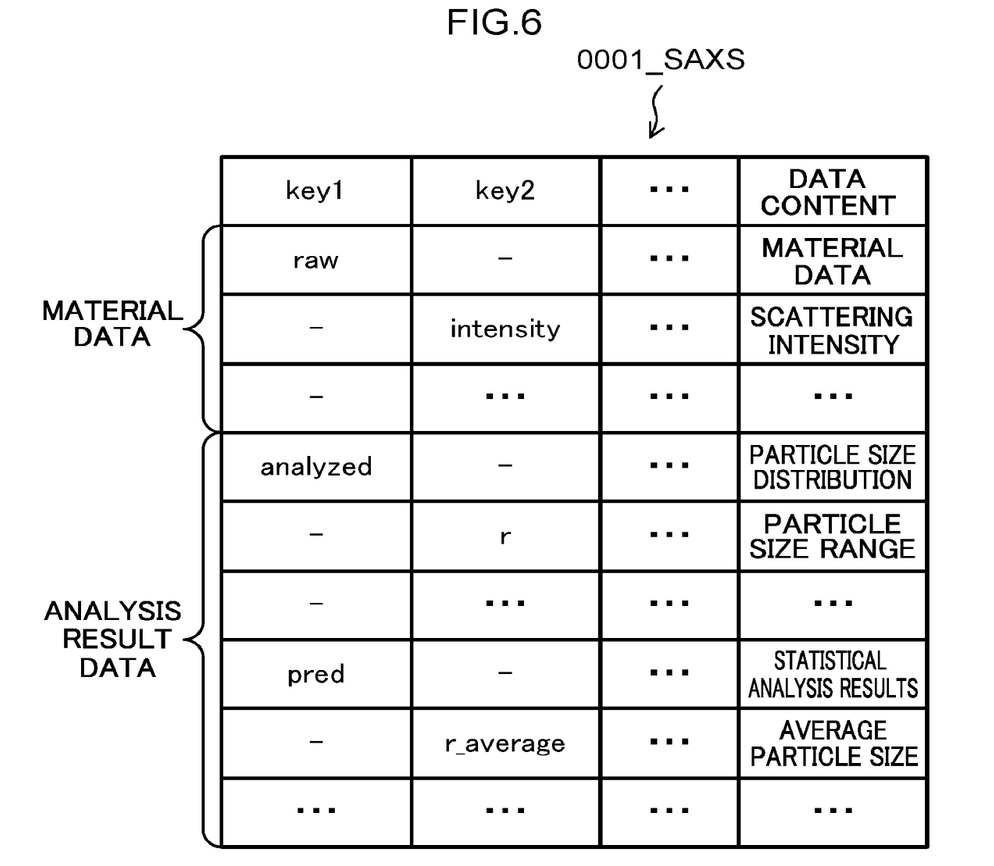
FIG. 6 is an example of data stored in a database of the embodiment.

Furthermore, as shown in FIG. 6, the analyzing unit 142 associates the material data by analysis technique with the analysis result data and stores them in the database 162. The database 162 is installed beforehand for each user. For this reason, the analyzing unit 142 associates the material data received by the receiving unit 140 with the analysis result data and stores them in the database 162 corresponding to the user ID received by the receiving unit 140. For example, in a case where the user ID represents the user terminal 12A, the analyzing unit 142 stores each data set in the database 162A of the storage device 16A corresponding to the user terminal 12A.

In the database 162, as shown in FIG. 6, the material data and the analysis result data are associated with each other and stored. The data "0001_SAXS" in FIG. 6 is an example of the data structure of the data "0001_SAXS" shown in FIG. 4.

Of the data shown in FIG. 6, "key1" and "key2" are search keys for searching the material data or the analysis result data. Because data are stored in the database 162 such that the material data and the analysis result data are associated with each other, the user can search for and browse the data he/she wants from the database 162 by operating the user terminal 12.

For example, the user can browse "scattering intensity" in the material data by operating the user terminal 12, setting "key1" shown in FIG. 6 to "raw," setting "key2" to "intensity," and searching the database 162.

Furthermore, for example, the user can browse "particle size range" in the analysis result data by operating the user terminal 12, setting "key1" shown in FIG. 6 to "analyzed," setting "key2" to "r," and searching the database 162.

Furthermore, for example, the user can browse "average particle size" in the analysis result data by operating the user terminal 12, setting "key1" shown in FIG. 6 to "pred," setting "key2" to "r_average," and searching the database 162.

In this way, because the material data and the analysis result data are organized and stored in the database 62, the user can easily and instantly browse the data he/she wants.

Figure 7:
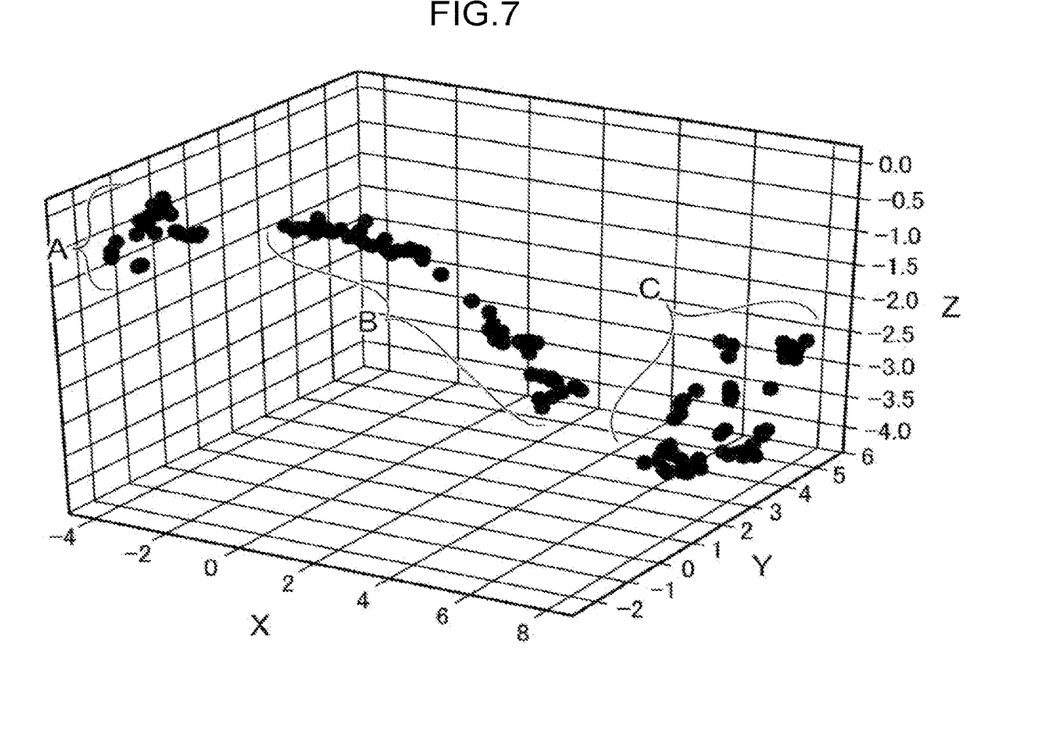
FIG. 7 is a drawing showing an example of analysis result data.

Moreover, past material data sent from the user terminal 12 and past analysis result data are also stored in the database 162. For this reason, the user can also easily and instantly search past data and data that have been analyzed this time. For example, as shown in FIG. 7, the user can also display, in one graph, analysis result data A of a given material analyzed on day a, analysis result data B of another material analyzed on day b, and analysis result data C of another material analyzed on day c.

Because of this, even when there are plural types of materials to analyze or when there are plural samples with respect to one material, material analysis can be efficiently performed.

Figure 8:
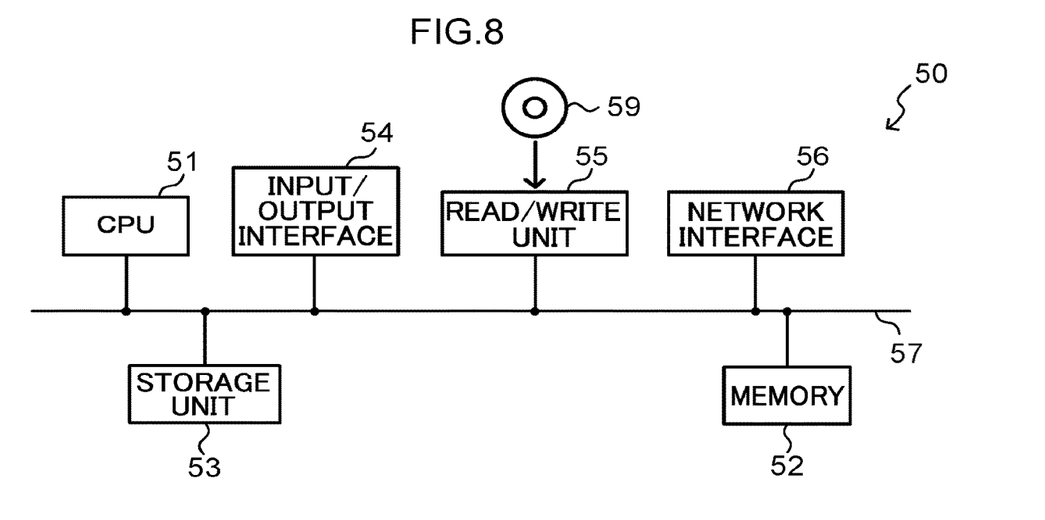
FIG. 8 is a drawing showing an example configuration of computer of a user terminal and a server pertaining to the embodiment.

The plural user terminals 12A, 12B, . . . , 12Z, the server 14, and the plural storage devices 16A, 16B, . . . , 16Z can be realized by a computer 50 such as shown in FIG. 8. The computer 50 that realizes the plural user terminals 12A, 12B, . . . , 12Z, the server 14, and the plural storage devices 16A, 16B, . . . , 16Z includes a CPU 51, a memory 52 serving as a temporary storage region, and a nonvolatile storage unit 53. The computer also includes an input/output interface 54 to which input/output devices (not shown in the drawings) are connected and a read/write unit 55 that controls the reading of data from and the writing of data to a recording medium 59. The computer also includes a network interface 56 connected to a network such as the Internet. The CPU 51, the memory 52, the storage unit 53, the input/output interface 54, the read/write unit 55, and the network interface 56 are connected to each other via a bus 57.

The storage unit 53 can be realized by a hard disk drive (HDD), a solid-state drive (SSD), or a flash memory, for example. In the storage unit 53 serving as a storage medium is stored a program for causing the computer to function. The CPU 51 reads the program from the storage unit 53, transfers it to the memory 52, and sequentially executes processes that the program has.

Next, the action of the information processing system 10 of the embodiment will be described.

Figure 9:
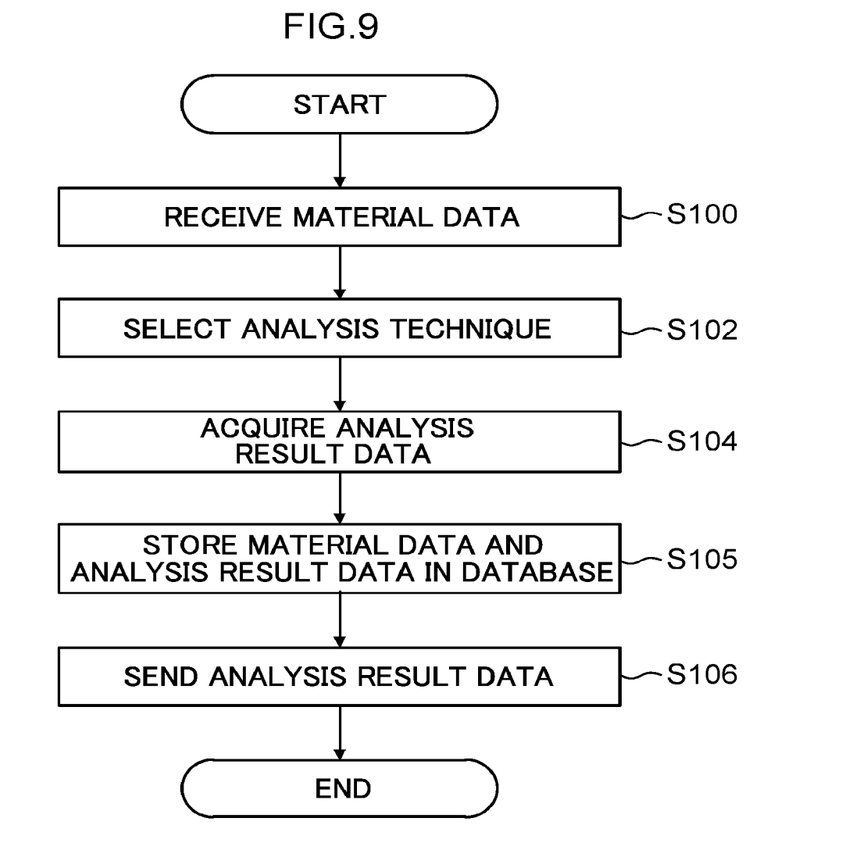
FIG. 9 is a flowchart showing an example of a process performed by an information processing device pertaining to the embodiment.

When the user ID, the material data, and the analysis technique ID are sent from the user terminal 12 to the server 14 and the server 14 receives those data sets, the server 14 executes an information processing routine shown in FIG. 9.

In step S100, the receiving unit 140 of the server 14 receives the user ID, the material data, and the analysis technique ID sent from the user terminal 12.

In step S102, the analyzing unit 142 selects an analysis technique with respect to the material data received in step S100. Specifically, the analyzing unit 142 selects an analysis technique in accordance with the analysis technique ID sent from the user terminal 12. The analyzing unit 142 selects the storage device 16 corresponding to the user ID received in step S100 and selects an analysis technique according to the analysis technique ID from among the analysis techniques stored in the analysis technique storage unit 160 of that storage device 16.

In step S104, the analyzing unit 142 performs an analysis of the material data using the subject analysis technique selected in step S102 to thereby obtain analysis result data.

In step S105, the analyzing unit 142 associates the material data received in step S100 with the analysis result data obtained in step S104 and stores them in the database 162. Specifically, the analyzing unit 142 associates the material data received in step S100 with the analysis result data obtained in step S104 and stores them in the database 162 corresponding to the user ID received in step S100.

In step S106, the sending unit 144 sends the analysis result data obtained in step S104 to the user terminal 12. Specifically, the sending unit 144 sends the analysis result data to the user terminal 12 corresponding to the user ID received in step S100.

The user operating the user terminal 12 obtains the analysis result data sent from the server.

As described above, the server 14 of the information processing system 10 pertaining to the embodiment receives material data relating to a material which have been sent from a user terminal. Then, the server 14 performs an analysis according to one or more analysis techniques with respect to the material data it has received to thereby acquire analysis result data representing analysis results. Then, the server 14 sends the analysis result data to the user terminal. Because of this, material analysis can be efficiently performed. More specifically, the user can efficiently obtain material analysis results without performing the material analysis himself/herself.

Furthermore, the server 14 of the information processing system 10 pertaining to the embodiment associates the material data by analysis technique with the analysis result data and stores them in the database. Because of this, it becomes possible for the user to also browse past data, and even when there are plural types of materials to analyze or when there are plural samples with respect to one material, material analysis can be efficiently performed.

Furthermore, according to the information processing system 10 pertaining to this embodiment, databases are provided for each of the plural user terminals, and the server 14 stores the material data and the analysis result data in the database corresponding to the user terminal that sent the material data. Because of this, information can be appropriately managed. For example, when the plural user terminals 12A, 12B, . . . , 12Z are utilized by different industries, information can be appropriately managed because the data of the plural industries are not stored in one database.

Furthermore, in the information processing system 10 pertaining to this embodiment, the server 14 that performs material analysis is one server, so costs when implementing the system can be reduced.

Although the processing performed by each of the devices in the above embodiment was described as software processing performed by executing a program, it may also be processing performed by hardware. Alternatively, the processing may also be processing that combines both software and hardware. Furthermore, the program stored in the ROM may also be stored in various types of recording media and distributed.

Moreover, this disclosure is not limited to what is described above and can of course be modified in various ways and implemented, in addition to what is described above, without departing from the spirit thereof.

For example, in the above embodiment, a case where the server comprises one server was described as an example, but the disclosure is not limited to this. Servers may also be provided for each of the plural user terminals. For example, the information processing system may also be configured as an information processing system 210 shown in FIG. 10.

Figure 10:
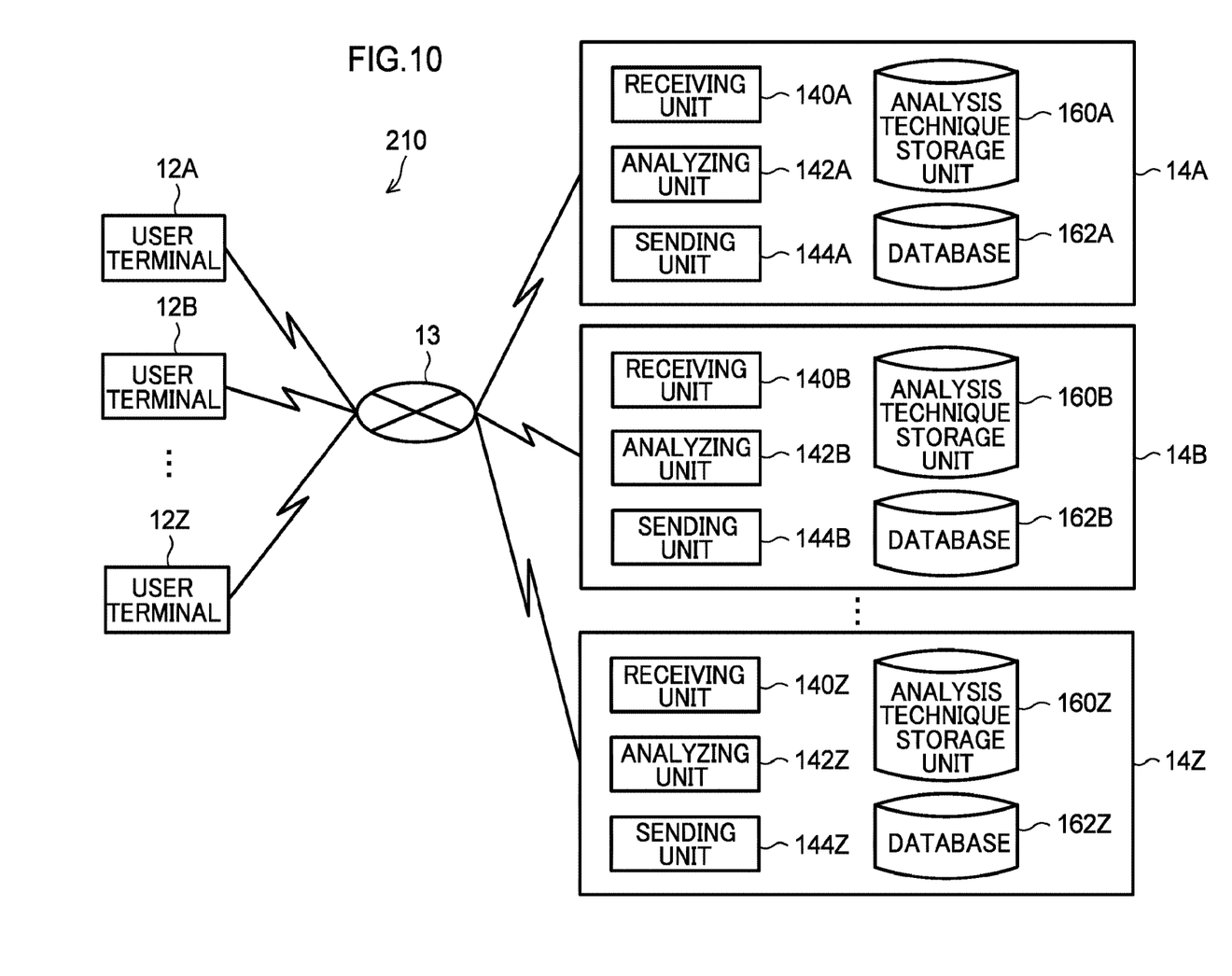
FIG. 10 is a drawing showing an example modification of the embodiment.

The information processing system 210 of FIG. 10 includes plural user terminals 12A, 12B, . . . , 12Z and servers 14A, 14B, . . . , 14Z provided for each of the plural user terminals 12A, 12B, . . . , 12Z. As shown in FIG. 10, the plural servers 14A, 14B, . . . , 14Z include analysis technique storage units 160A, 160B, . . . , 160Z and databases 162A, 162B, . . . , 162Z, respectively. Each of the plural servers 14A, 14B, . . . , 14Z receives material data relating to a material which have been sent from a particular user terminal of the plural user terminals 12A, 12B, . . . , 12Z and perform an analysis according to one or more analysis techniques with respect to the material data it has received to thereby acquire analysis result data representing analysis results. Then, each of the plural servers 14A, 14B, . . . , 14Z sends the analysis result data to the particular user terminal, associates the material data it received with the analysis result data, and stores the data in the database that the server has.

For example, the server 14A receives material data sent from the user terminal 12A, which is a particular user terminal, and performs an analysis according to one or more analysis techniques with respect to the material data to thereby acquire analysis result data representing analysis results. Then, the server 14A sends the analysis result data to the user terminal 12A, which is a particular user terminal, associates the material data it received with the analysis result data, and stores the data in the database 162A that the server 14A has.

According to the information processing system 210 of FIG. 10, servers are provided for each user terminal, so material analysis processing can be accelerated.

Furthermore, in the above embodiment, a case where databases are provided for each of the plural user terminals was described as an example, but the disclosure is not limited to this. For example, the information processing system may also be configured as an information processing system 310 shown in FIG. 11.

Figure 11:
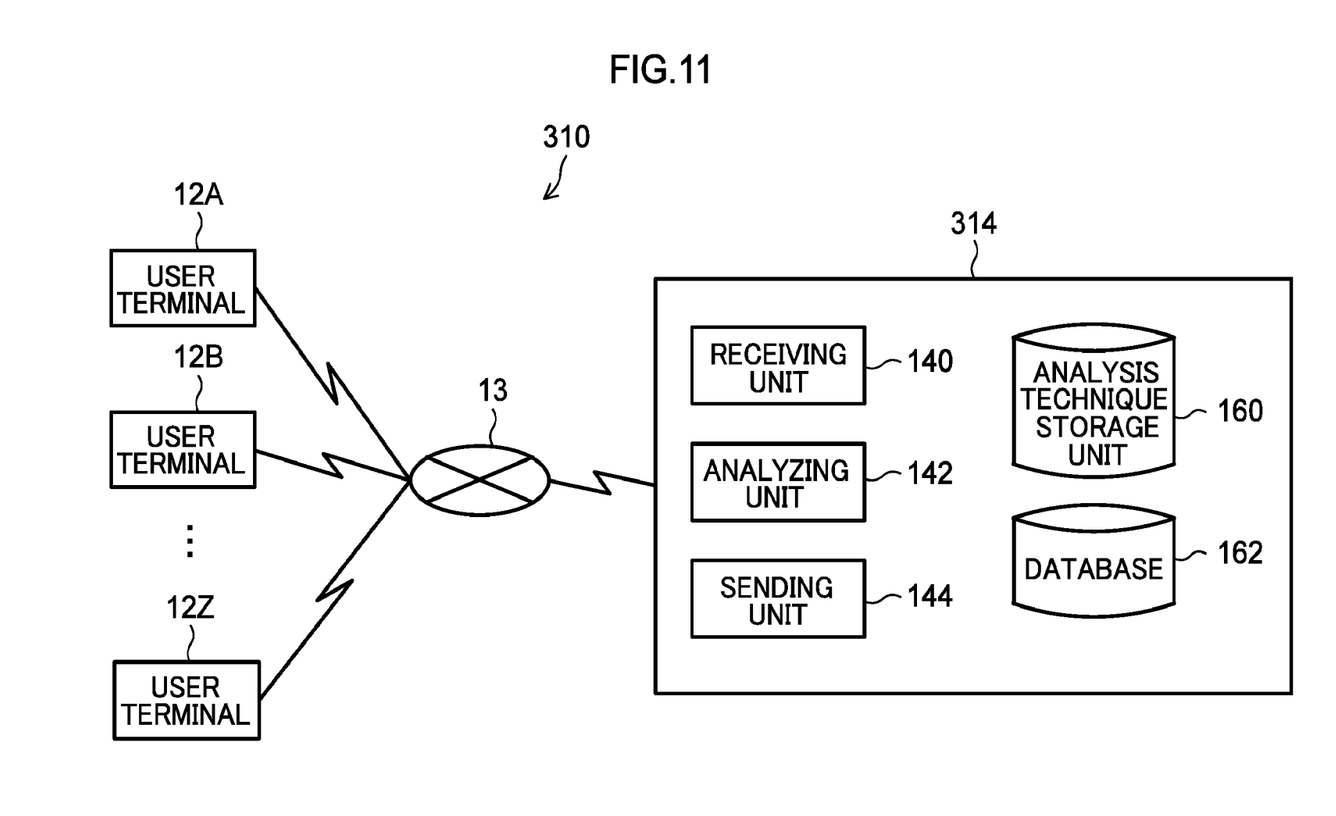
FIG. 11 is a drawing showing an example modification of the embodiment.

A server 314 of the information processing system 310 shown in FIG. 11 receives material data relating to a material which have been sent from a user terminal. The server 314 performs an analysis according to one or more analysis techniques with respect to the material data that have been received to thereby acquire analysis result data representing analysis results. Then, the server 314 sends the analysis result data that have been acquired to the user terminal. In the information processing system 310 of FIG. 11, servers are not provided for each of the user terminals, so costs when implementing the system can be reduced. Furthermore, when individual users among plural users belonging within one industry utilize the plural user terminals 12A, 12B, . . . , 12Z, they can share data.

Furthermore, in the above embodiment, a case where the analyzing unit 142 selects an analysis technique in accordance with the analysis technique ID representing analysis technique identification information sent from the user terminal 12 was described as an example, but the disclosure is not limited to this. For example, the analyzing unit 142 may also select an analysis technique in accordance with the value or type of the material data (distribution of values (0.1 to 1, etc.) or whether the material data are image data or numerical data). For example, the analyzing unit 142 selects image analysis if the material data are image data. Furthermore, for example, the analyzing unit 142 selects a particular analysis technique from among plural analysis techniques when the distribution of values in the material data is 0.1 to 1. Furthermore, for example, the analyzing unit 142 selects a particular analysis technique from among the plural analysis techniques in accordance with text data in the header portion of the material data (e.g., "scattering intensity," "scattering angle," etc. in the data shown in FIG. 3). The selection of the analysis technique according to the material data may also be performed by a learned model obtained beforehand by machine learning.

Furthermore, in the above embodiment, a case where the server 14 selects an analysis technique and performs an analysis according to the selected analysis technique was described as an example, but the disclosure is not limited to this. For example, plural servers that differ by analysis technique may also be prepared beforehand, and those servers may execute analyses.

All publications, patent applications, and technical standards mentioned in this specification are herein incorporated by reference to the same extent as if each individual publication, patent application, or technical standard was specifically and individually indicated to be incorporated by reference.

What is claimed is:

1. An information processing device, comprising: a memory; a database: and a processor connected to the memory, the processor being configured to: receive material data, relating to a material, that have been sent from a user terminal, perform analysis using one or more analysis techniques based on the material data to thereby acquire analysis result data representing analysis results by selecting a subject analysis technique from one or more analysis techniques in accordance with a value or type of the material data and perform analysis of the material data using the selected subject analysis technique, send the analysis result data to the user terminal, associate the material data with the analysis result data and store the associated material data and analysis result data in the database, search data from the database based on a combination of a first search key and a second search key transmitted from the user terminal, and transmit the searched data to the user terminal, wherein an analysis technique ID corresponding to the selected subject analysis technique is transmitted together with the material data from the user terminal and received by the information processing device, the information processing device is configured to select the analysis technique according to the analysis technique ID transmitted from the user terminal from among the one or more analysis techniques stored in an analysis technique storage unit of a storage device, and each of the associated material data and analysis result data stored in the database is searchable based on a combination of the first search key and the second search key, where: the first search key is a search key for designating the type of the material data or the type of the analysis result data, and the second search key is a search key for specifying the type of the material data based on the selected subject analysis technique or the type of the analysis result data based on the selected subject analysis technique.

2. The information processing device of claim 1, wherein, in the database, the material data for each analysis technique and the analysis result data are associated with each other and stored.

3. An information processing device in an information processing system including a plurality of user terminals, an information processing device comprising a memory and a processor connected to the memory, and databases provided for each of the plurality of user terminals, the processor being configured to: receive material data, relating to materials, and user IDs for identifying the user terminals, which have been sent from the user terminals, perform analysis using one or more analysis techniques based the received material data to thereby acquire analysis result data representing analysis results by selecting a subject analysis technique from one or more analysis techniques in accordance with a value or type of the material data and perform analysis of the material data using the selected subject analysis technique, send the analysis result data to the user terminals corresponding to the received user IDs, associate the received material data with the analysis result data and store the associated material data and analysis result data in the databases corresponding to the received user IDs, search data from the database based on a combination of a first search key and a second search key transmitted from the user terminal corresponding to the received user IDs, and transmit the searched data to the user terminal corresponding to the received user IDs, wherein an analysis technique ID corresponding to the selected subject analysis technique is transmitted together with the material data from the user terminals and received by the information processing device, the information processing device is configured to select the analysis technique according to the analysis technique ID transmitted from the user terminal from among the one or more analysis techniques stored in an analysis technique storage unit of a storage device, and each of the associated material data and analysis result data stored in the database is searchable based on a combination of the first search key and the second search key, where: the first search key is a search key for designating the type of the material data or the type of the analysis result data, and the second search key is a search key for specifying the type of the material data based on the selected subject analysis technique or the type of the analysis result data based on the selected subject analysis technique.

4. An information processing device in an information processing system including a plurality of user terminals and information processing devices provided for each of the plurality of user terminals, each of the information processing devices comprising a database, a memory and a processor connected to the memory, the processor being configured to: receive material data, relating to a material, that have been sent from a specific user terminal among the plurality of user terminals, perform analysis in accordance with one or more analysis techniques with respect to the received material data to thereby acquire analysis result data representing analysis results by selecting a subject analysis technique from one or more analysis techniques in accordance with a value or type of the material data and perform analysis of the material data using the selected subject analysis technique, send the analysis result data to the specific user terminal, associate the received material data with the analysis result data and store the associated material data and analysis result data in the database, search data from the database based on a combination of a first search key and a second search key transmitted from the user terminal, and transmit the searched data to the user terminal, wherein an analysis technique ID corresponding to the selected subject analysis technique is transmitted together with the material data from the user terminals and received by the information processing device, the information processing device is configured to select the analysis technique according to the analysis technique ID transmitted from the user terminal from among the one or more analysis techniques stored in an analysis technique storage unit of a storage device, and each of the associated material data and analysis result data stored in the database is searchable based on a combination of the first search key and the second search key, where: the first search key is a search key for designating the type of the material data or the type of the analysis result data, and the second search key is a search key for specifying the type of the material data based on the selected subject analysis technique or the type of the analysis result data based on the selected subject analysis technique.

5. An information processing method comprising executing processing by a processor, the processing comprising: receiving material data, relating to a material, that have been sent from a user terminal; performing analysis in accordance with one or more analysis techniques with respect to the received material data to thereby acquire analysis result data representing analysis results by selecting a subject analysis technique from one or more analysis techniques in accordance with a value or type of the material data and perform analysis of the material data using the selected subject analysis technique; sending the acquired analysis result data to the user terminal; associating the material data with the analysis result data and storing the associated material data and analysis result data in a database; searching data from the database based on a combination of a first search key and a second search key transmitted from the user terminal: and transmitting the searched data to the user terminal, wherein an analysis technique ID corresponding to the selected subject analysis technique is transmitted together with the material data from the user terminal and received by the information processing device, the information processing device is configured to select the analysis technique according to the analysis technique ID transmitted from the user terminal from among the one or more analysis techniques stored in an analysis technique storage unit of a storage device, and each of the associated material data and analysis result data stored in the database is searchable based on a combination of the first search key and the second search key, where: the first search key is a search key for designating the type of the material data or the type of the analysis result data, and the second search key is a search key for specifying the type of the material data based on the selected subject analysis technique or the type of the analysis result data based on the selected subject analysis technique.

6. A non-transitory computer readable storage medium storing an information processing program executable by a processor to perform processing comprising: receiving material data, relating to a material, that have been sent from a user terminal; performing analysis in accordance with one or more analysis techniques with respect to the received material data to thereby acquire analysis result data representing analysis results by selecting a subject analysis technique from one or more analysis techniques in accordance with a value or type of the material data and perform analysis of the material data using the selected subject analysis technique; sending the acquired analysis result data to the user terminal; associating the material data with the analysis result data and storing the associated material data and analysis result data in a database: searching data from the database based on a combination of a first search key and a second search key transmitted from the user terminal; and transmitting the searched data to the user terminal, wherein an analysis technique ID corresponding to the selected subject analysis technique is transmitted together with the material data from the user terminal and received by the information processing device the information processing device is configured to select the analysis technique according to the analysis technique ID transmitted from the user terminal from among the one or more analysis techniques stored in an analysis technique storage unit of a storage device, and each of the associated material data and analysis result data stored in the database is searchable based on a combination of the first search key and the second search key, where: the first search key is a search key for designating the type of the material data or the type of the analysis result data, and the second search key is a search key for specifying the type of the material data based on the selected subject analysis technique or the type of the analysis result data based on the selected subject analysis technique.

7. The information processing device of claim 1, wherein the information processing device is configured to automatically perform analysis in accordance with the one or more analysis techniques with respect to the material data.

* * * * *